United States Patent [19]

Ueda et al.

[11] Patent Number: 5,057,195

[45] Date of Patent: Oct. 15, 1991

[54] ELECTRODEPOSITION COATING METHOD AND AN ELECTROPAINT TO BE USED THEREIN

[75] Inventors: Tetsuo Ueda, Osaka; Haruhiko Takasaki, Hiroshima; Shigeru Kurokawa, Osaka, all of Japan

[73] Assignee: Nippon Paint Co., Ltd., Osaka, Japan

[21] Appl. No.: 392,281

[22] Filed: Aug. 11, 1989

[51] Int. Cl.$^5$ .................. C25D 13/10; C25D 5/02; H01F 1/26

[52] U.S. Cl. .................. 204/181.4; 204/180.2; 204/16; 252/62.54

[58] Field of Search .............. 204/180.2, 180.7, 180.9, 204/181.7, 181.4; 252/62.56, 62.54

[56] References Cited

U.S. PATENT DOCUMENTS

| | | | |
|---|---|---|---|
| 4,210,505 | 7/1980 | Todoroki et al. | 204/180.2 |
| 4,569,740 | 2/1986 | Takahashi et al. | 204/181.7 |
| 4,585,535 | 4/1986 | Sher et al. | 252/62.54 |

FOREIGN PATENT DOCUMENTS

| | | |
|---|---|---|
| 0028093 | 12/1975 | Japan . |
| 95167 | 4/1989 | Japan . |
| 172415 | 7/1989 | Japan . |
| 22368 | 1/1990 | Japan . |

*Primary Examiner*—John F. Niebling
*Assistant Examiner*—Kishor Mayekar
*Attorney, Agent, or Firm*—Wenderoth, Lind & Ponack

[57] ABSTRACT

The present invention provides an electrodeposition coating method for various substrates, including complicated structural fabrications with many edge portions, which is specifically useful in the automobile industry and capable of producing an excellent coating even at the edge portions and an electropaint to be used therein.

3 Claims, No Drawings

stands for a bivalent metal, as, for example, cobalt ferrite ($CoFe_2O_4$), copper ferrite ($CuFe_2O_4$), zinc ferrite ($ZnFe_2O_4$), manganese ferrite ($MnFe_2O_4$), nickel ferrite ($NiFe_2O_4$), magnesium ferrite ($MgFe_2O_4$), complex ferrites; composites of high molecular weight compounds with ferrites as, for example, ferrite plated resin particles as disclosed in Japanese Patent Publication (unexamined) No. 111929/84, ibid 065085/88, and ibid 075494/87; composites of high molecular weight compounds with magnetites; magnetite ($Fe_3O_4$); γ-iron oxide ($Fe_2O_3$) and the like.

ELECTRODEPOSITION COATING METHOD AND AN ELECTROPAINT TO BE USED THEREIN

FIELD OF THE INVENTION

The present invention relates to an electrodeposition coating method which is excellent in covering properties even at edge portions of a substrate electrocoated therewith and capable of producing a coating with excellent surface smoothness and corrosion protection and to an electropaint to be used in said method.

BACKGROUND OF THE INVENTION

When an electrodeposition coating method is adopted, both the exterior and interior of a structure can be advantageously coated and therefore, such method is widely used in various technical fields, including the automobile industry. However, in a complicated structural fabrication, there are many edge portions which are hardly coated with an electropaint and therefore many of such portions are usually applied with a sealer, an anticorrosive wax or the like. Such a countermeasure is, however, not effective enough for the intended object, and the present market demands a novel coating method which will give an improved covering at the edge portions and which is capable of producing a coating with excellent surface smoothness and corrosion protection.

It is, therefore, an object of the invention to provide an electrodeposition coating method which will fulfil the abovementioned requirements. It is an additional object of the invention to provide an electropaint which can be advantageously used in said method.

SUMMARY OF THE INVENTION

According to the present invention, the abovementioned objects can be attained with an electrodeposition coating method which is characterized in that a substrate is subjected to an electrocoating with an electropaint containing 0.01 to 30% by weight, with respect to the total solid of the paint, of particles each having magnetic a magnetization value of 0.3 to 90 nmu/g, in magnetic field, and an electropaint containing 0.01 to 30% by weight, with respect to the total solid content of the paint, of particles each having a magnetic function of magnetization value of 0.3 to 90 nmu/g.

PREFERRED EMBODIMENTS OF THE INVENTION

The present invention has been made on the basis of the novel finding that a specifically excellent corrosion protection at an edge portion of a substrate can be attained by electrocoating the substrate having such edge portions with an electropaint comprising conventional cationic or anionic electropaint having incorporated therein a specific amount of particles having the magnetic function of a particular magnetization value in resect to the magnetic field.

As a principal binder of the anionic type electropaint, any of the conventional anionic resins may be satisfactorily used as, for example, a maleic oil resin disclosed in Japanese Patent Publication No. 24566/74 and as a principal binder of the cationic type electropaint, any of the conventional cationic resins as, for example, those resins described in Japanese Patent Publication Nos. 6306/77, 34238/80, 22912/81 and 34186/81 Among them, particular preference is given to a cationic resin obtained by the reaction of an epoxy resin and an amino group bearing compound. This, however, should not be taken as the sole preferable cationic resin, since any of such resins as basic group bearing-phenol resins, -polybutadiene resins, -acrylonitrile resins, -styrene resins, or -their malein-dien modified resins may be used.

Examples of particles having the magnetic properties advantageously used in the present invention are ferrites represented by the formula: $MFe_2O_4$ in which M Such magnetic particles, as described above, each have a magnetization value of 0.3 to 90 emu/g and hence are advantageously and preferably used in this invention. If the magnetization value of such particles is less-than 0.3 emu/g, the electropaint containing such particles will fail to produce a satisfactory coating at the edge portions of the substrate even by the present electrodeposition means, resulting in a deficient corrosion protection. If the magnetization value of the selected particles is more than 90 emu/g, there results in an excessive electrodeposition of the electropaint on the whole surfaces of a substrate, resulting in a failure in to obtain the objectives of the present invention. Therefore, the magnetization value of such particles should be within the range of 0.3 to 90 emu/g, preferably in the range of 10 to 70 emu/g.

In this invention, the content of the magnetic particles in the electropaint is within the range of 0.01 to 30% by weight, preferably 0.1 to 15 % by weight, with respect to the total solid of the paint, which properties result in better surface smoothness and corrosion protection at the edge portions. In a conventional electropaint, there is a need to add with a compound having an anticorrosive action as, for example, a lead compound, a chromate compound and the like, to improve the corrosion protection of the formed coating. However, in the present electropaint, there is no need of using such compound Of course, it is possible to add other optional conventional additives, if desired.

In the present invention, a substrate is electrocoated with the abovementioned electropaint in a magnetic field Thus, in the present electrodeposition coating method, a direct current is applied between a metallic bath container and a substrate suspension-held in said electropaint bath and at the same time, a magnetic field is formed by bringing a permanet magnet or electromagnet in contact with said substrate or placing the same between the substrate and the bath container or making the same in contact with said bath container. When an electrodeposition coating is carried out under the abovementioned conditions, a strong magnetic force is generated around the substrate and especially at the edge portions and a quantity of the magnetic particles are deposited at the edge surface areas. Therefore, when the electrocoated material is subjected to a subsequent baking operation, a coating containing a quantity of such particles is formed at the edge surface areas and excellent corrosion protection at the edge portions and an excellent surface smoothness at the flat portions are achieved. The abovementioned effects are surely obtained according to the present invention At that time, one may select appropriate magnet having an appropriate magnetic force, depending on the distance from the edge surface are of the substrate and the type and the amount of magnetic particles in the electropaint used or like.

The invention will now more fully explained in the following Examples. Unless otherwise being stated, all parts and % are by weight.

SYNTHETIC EXAMPLE 1

Preparation of anionic resin varnish A 652.8 parts of maleinized oil resin prepared from linseed oil and modified in about 15 weight % with malic anhydride were compounded with 111 parts of 29% aqueous ammonium hydroxide solution, 145 parts of n-butoxyethanol and 36.6 parts of deionized water to obtain an aqueous anionic resin varnish having a solid content of 70% and pH 7.8.

Preparation of cationic resin varnish B

An amine-epoxy addition product (component a) was prepared by mixing 1000 parts of bisphenol-A digycidyl ether (epoxy equivalent 910) with 463 parts of ethyleneglycol monoethylether and 80.3 parts of diethylamine. Separately, 875 parts of Coronate L (polyisocyanate having NCO 13%, NV 75% by weight, manufactured by Nippon Polyurethane K.K.) were added with 0.05 parts of dibutyltin laurate and 390 parts of 2-ethylhexanol and the thus obtained reaction product was diluted with 130 parts of ethyleneglycol monoethylether to obtain component b.

1,000 parts of the component a and 400 parts of the component b were mixed well, neutralized with 30 parts of glacial acetic acid and then diluted with 570 parts of deionized water to obtain an aqueous cationic resin varnish B having a solid content of 50%.

Preparation of cationic resin varnish C 150 parts of the cationic resin varnish B were neutralized with 0.8 parts of glacial acetic acid to obtain an aqueous cationic resin varnish C having a solid content of 0%.

SYNTHETIC EXAMPLE 2

Preparation of pigment paste I

Red iron oxide 49.8 parts
carbon black 113.7
lead silicate 46.2
aluminium silicate 122.5
strontium chromate 32.0

To the mixture of the abovementioned ingredients, 203 parts of the resin varnish A and 370 parts of deionized water were added and the combined composition was stirred, glass beads were added and dispersed well in a high speed disper to obtain a pigment paste I having a solid content of 53%.

SYNTHETIC EXAMPLE 3

Preparation of pigment paste II

Titanium oxide 242.1 parts
carbon black 9.5
aluminium silicate 125.8
lead silicate 32.9

To the mixture of the abovementioned ingredients, 201.8 parts of the resin varnish C and 352.5 parts of deionized water were added and the combination was stirred, glass beads were added and dispersed well in a high speed disper to obtain a pigment paste II having a solid content of 53%.

SYNTHETIC EXAMPLE 4

Preparation of ferrite plated resin particles

Synthesis of resin particles

Into a polymerization reactor fitted with a stirrer, a thermometer, dropping funnel, a reflux condenser, heating device, and a nitrogen gas inlet tube, were placed 150 parts of deionized water, and to this 1 part of a monomer mixture (A) of styrene : 2ethylhexyl acrylate=90:10 and 10 parts of 10% aqueous ammonium persulfate solution were added at 80° C. Thereafter, 99 parts of the abovementioned monomer mixture (A) was dropwise added in a 3 hour time span to obtain an emulsion. The emulsion particles were observed by an electron microscope and it was found that they were almost of a monodisperse type and the average diameter of the particles was 0.6 $\mu$.

Formation of ferrite plating layer

Before the plating operation, the following were provided: 50%(by weight) of an aqueous ferrous chloride solution; 50% (by weight) of an aqueous ammonium acetate solution; and 10% (by weight) of an aqueous sulfite solution. Into a reactor fitted with a stirrer, a thermometer, dropping funnels, a heating device and a nitrogen gas inlet tube, was placed 100 parts of the abovementioned emulsion (solid content 30%) and oxygen occluded in the emulsion was thoroughly removed by introducing nitrogen gas therein. Next, 240 parts of the ferrous chloride solution (solid 120 parts) and 400 parts of the ammonium acetate solution (solid 200 parts) were added and the combination stirrered well and heated to 70° C. While continuing stirring, the pH of the mixture was adjusted to 7.2 with an aqueous ammonia. To this solution, 270 parts of the sodium sulfite solution (solid 27 parts) was added dropwise over a time span of about 1 hour, while introducing nitrogen gas, while stirring and maintaining the inner temperature at 70° C. and pH 7.0 to 72, thereby forming magnetite on the whole surface of the respective particles. After 20 minutes later, the mixture was allowed to cool, filtered and the collected particles were repeatedly washed with deionized water and dried to obtain plated resin particles having magnetic properties (I).

When examined by X-ray diffraction and electron microscope, it was found that a magnetite crystalline layer was uniformly formed on the whole surface of the respective particle. The characteristics of the obtained particles were as follows: specific gravity 2.15; electric resistance $2 \times 10^6 \Omega$.cm; magnetization value 50 emu/g.

SYNTHETIC EXAMPLE 5

Preparation of pigment paste III

Red iron oxide 48.8 parts
carbon black 111.4
lead silicate 45.3
aluminium silicate 120.1
strontium chromate 31.4

To the mixture of the abovementioned ingredients, 203 parts of the resin varnish A and 388.5 parts of deionized water were added and the combination stirred, glass beads were added and dispersed well in a high speed disper. Next, 7.3 parts of the ferrite plated resin particles obtained in Synthetic Example 4 were added and mixed well to obtain a pigment paste III having a solid content of 53%.

SYNTHETIC EXAMPLE 6

Preparation of pigment paste IV

Titanium oxide 237.3 parts
carbon black 9.3
aluminium silicate 123.3
lead silicate 32.2

To the mixture of the abovementioned ingredients, 201.8 parts of the resin varnish C and 352.5 parts of deionized water were added and the combination stirred, glass beads were added and dispersed well in a high speed disper. Next, 8.2 parts of the ferrite plated resin particles obtained in Synthetic Example 4 were added and mixed well to obtain a pigment paste IV having a solid content of 53%.

SYNTHETIC EXAMPLE 7

The same procedures as stated in Synthetic Example 6 were repeated with the following materials to obtain a pigment paste V having a solid content of 53%.
Titanium oxide 121.1 parts
carbon black 4.8
aluminium silicate 62.9
lead silicate 16.5
resin varnish C 201.8
deionized water 352.5
ferrite plated resin particles of Synthetic Example 4 205.2

SYNTHETIC EXAMPLE 8

Preparation of pigment paste VI

Titanium oxide 237.3 parts
carbon black 9.3
aluminium silicate 123.3
lead silicate 32.2
γiron oxide 8.2

To the mixture of the abovementioned ingredients, 201.8 parts of the resin varnish C and 352.5 parts of deionized water were added and the combination stirred, glass beads were added and dispersed well in a high speed disper to obtain a pigment paste VI having a solid content of 53%.

SYNTHETIC EXAMPLE 9

Preparation of pigment paste VII

Titanium oxide 237.3 parts
carbon black 9.3
aluminium silicate 123.3
lead silicate 32.2
manganese ferrite 8.2

To the mixture of the abovementioned ingredients, 201.8 parts of the resin varnish C and 352.5 parts of deionized water were added and the combination stirred, glass beads were added and dispersed well in a high speed disper to obtain a pigment paste VII having a solid content of 53%.

EXAMPLE 1

351.4 parts of the anionic resin varnish A obtained in the Synthetic Example 1 and 264 parts of deionized water were mixed well and to this, was added 101 parts of the pigment paste III obtained in Synthetic Example 4 and the combination stirred and diluted with 1779.4 parts of deionized water to obtain an anionic electrodeposition coating composition having a solid content of 12% and pH 8.0.

Into a stainless steel bath container, was placed the abovementioned electrodeposition coating composition and a commercialized OLFA cutter knife blade LB-10 chemically pretreated with Glanodine SD 2500 (Nippon Paint Co. Ltd.) was dipped into said bath and the blade was connected to a cathode of a direct current source and the bath wall to an anode. At the same time, a permanent magnet (manufactured by Sumitomo Special Metal K.K. 50×50×10 mm Class 100 gauss) was located at the middle between said blade and said bath wall and a direct current (150 V) was applied between said electrodes for 3 minutes to deposit coating materials on the whole surface of said blade. The thus treated blade was washed with water and subjected to a baking at 170° C. for 30 minutes to obtain a coating having a dry film thickness of about 20 $\mu$ (measured at flat portion).

The thus obtained coating (H) was tested in a salt spray test machine (JIS Z-2371) and examined corrosion time (i.e. time required for generating corrosion) at the edge portion. No corrosion at the edge portion was observed even after 500 hours or more of spraying time.

The same results were obtained even when a permagent magnet was placed in contact with said blade and when it was brought in contact with the outer wall of said bath container.

EXAMPLE 2 cationic resin varnish B 705.6 parts
pigment paste IV 277.8
deionized water 1516.6

To 1516.6 parts of deionized water, was added 705.6 parts of cationic resin varnish B and after stirring, 277.8 parts of pigment paste IV to obtain a coating composition having a solid content of 20%. The same procedures as stated in Example 1 were repeated with the said composition and the coated blade was tested as in Example 1. The test result was shown in Table 1.

EXAMPLE 3

The similar experiments as stated in Example 2 was repeated and however, in this experiment the following materials were used for the preparation of a coating composition.
cationic resin varnish B 705.6 parts
pigment paste V 277.8
deionized water 1516.6
The test result was shown in Table 1.

EXAMPLE 4

The similar experiment as stated in Example 2 was repeated, and however, in this experiment the following materials were used for the preparation of a coating composition.
cationic resin varnish B 705.6 parts
pigment paste VI 277.8
deionized water 1516.6
The test result was shown in Table 1.

EXAMPLE 5

The similar experiment as stated in Example 2 was repeated, however, in this experiment the following materials were used for the preparation of a coating composition.
cationic resin varnish B 705.6 parts
pigment paste VII 277.8
deionized water 1516.6

The test result was shown in Table 1.

COMPARATIVE EXAMPLE 1

The similar experiment as stated in Example 1 was repeated, however, in this experiment the following materials were used for the preparation of a coating composition.
anionic resin varnish A 351.4 parts
pigment paste I 101.0
deionized water 2043.4

The test result was shown in Table 1.

COMPARATIVE EXAMPLE 2

The similar experiment as stated in Example 2 was repeated, however, in this experiment the following materials were used for the preparation of a coating composition.
cationic resin varnish B 705.6 parts
pigment paste II 277.8
deionized water 1516.6

The test result was shown in Table 1.

TABLE 1

| Example | 1 | 2 | 3 | 4 | 5 |
|---|---|---|---|---|---|
| corrosion time (hours)* | 500 or more | 500 or more | 500 or more | 500 or more | 500 or more |

| Comp. Ex. | 1 | 2 |
|---|---|---|
| corrosion time (hours)* | 24 or less | 48 or less |

*... time required for the generation of corrosion at edge portion

What is claimed is:

1. An electrodeposition coating method which comprises subjecting a substrate to an electrocoating in a magnetic field with an electropaint containing 0.01 to 30% by weight, with respect to the total solid of the paint, of particles each having a magnetic function such that the magnetization value is 0.3 to 90 emu/g.

2. A method according to claim 1, wherein the magnetization value of the particles having magnetic function is 10 to 70 emu/g.

3. An electropaint containing 0.01 to 30% by weight, with respect to the total solid of the paint, of ferrite plated resin particles having a magnetization value of 0.3 to 90 emu/g.

* * * * *